United States Patent [19]

Rossignol

[11] Patent Number: 5,102,047

[45] Date of Patent: Apr. 7, 1992

[54] FUEL INJECTION PUMP FOR INTERNAL COMBUSTION ENGINES

[75] Inventor: Francois Rossignol, Mornant, France

[73] Assignee: Robert Bosch GmbH, Stuttgart, Fed. Rep. of Germany

[21] Appl. No.: 592,400

[22] Filed: Oct. 3, 1990

[30] Foreign Application Priority Data

Dec. 30, 1989 [DE] Fed. Rep. of Germany ....... 3943419

[51] Int. Cl.⁵ .......................................... F02M 57/00
[52] U.S. Cl. ...................................... 239/88; 239/600
[58] Field of Search ................................... 239/88–94, 239/600

[56] References Cited

U.S. PATENT DOCUMENTS

| | | | |
|---|---|---|---|
| 2,144,862 | 1/1939 | Truxell, Jr. | 299/107.2 |
| 2,530,128 | 11/1950 | Mashinter | 239/88 X |
| 2,571,501 | 10/1951 | Truxell, Jr. | 299/107.2 |
| 2,590,575 | 3/1952 | Rogers | 103/41 |
| 4,392,612 | 7/1983 | Deckard et al. | 239/88 |
| 4,452,574 | 6/1984 | Leblanc et al. | 417/494 |
| 4,653,455 | 3/1987 | Eblen et al. | 123/506 |
| 4,951,874 | 8/1990 | Onishi et al. | 239/88 |

Primary Examiner—Andres Kashnikow
Assistant Examiner—Kevin Weldon
Attorney, Agent, or Firm—Edwin E. Greigg; Ronald E. Greigg

[57] ABSTRACT

A fuel injection pump which has a pump piston disposed in a pump housing and guided in the pump housing. A drive tappet connected to the pump piston is movable by means of a mechanical drive element in a longitudinal direction of the pump cylinder counter to the force of a restoring spring. A guide sleeve surrounds a tappet insert and is guided in a reciprocating direction of the pump piston in a guide tube disposed on the pump housing and surrounded by the restoring spring. The guide sleeve includes a loss prevention device for the drive tappet and pump piston. The guide sleeve has an inwardly oriented collar with a bearing surface upon which a U-shaped disk rests and the disk presses against an outer collar provided on the pump piston. This disk keeps the pump piston in contact with the tappet insert of the drive tappet. A lateral opening is provided in the wall of the guide sleeve, above the bearing surface of the U-shaped disk, through which the U-shaped disk can be introduced.

22 Claims, 2 Drawing Sheets

Fig. 1

FUEL INJECTION PUMP FOR INTERNAL COMBUSTION ENGINES

BACKGROUND OF THE INVENTION

The invention is based on a fuel injection pump for internal combustion engines as defined hereinafter.

With fuel injection pumps and in particular unit fuel injectors of this kind, a greater degree of freedom in terms of open- and closed-loop control interventions into the entire course of injection is attained than can be done with injection pumps of a distributor or in-line type. However, this higher degree of freedom entails a higher operating pressure, particularly when used in high-speed direct injection engines. Moreover, the camshaft of the engine is used to drive the pump piston, making it possible to economize on additional drive losses an making higher drive forces available for the possibly necessary higher injection pressures. On the other hand, these high drive forces dictate suitably dimensioned restoring springs, which require a great amount of space.

The high drive forces also bring strong shear forces to bear on the drive tappet. The point of engagement of these drive forces on the drive tappet must therefore be located as low as possible, to avoid canting of the tappet in the guide tube.

In a known unit fuel injector of this generic type (U.S. Pat. No. 4,452,574), a ball tappet bolt is therefore interposed between the drive element and the drive tappet; it engages the bottom of the cupshaped tappet insert. This embodiment has the further advantage that because of the ball tappet bolt, an additional degree of freedom is obtained, by means of which tolerances in length can be compensated for.

On the other hand, however, this known unit fuel injector has the disadvantage that the tappet diameter is relatively large, so that the remaining clearance for the restoring spring and tappet guidance is small. Because the pump piston is suspended inside the intermediate sleeve, which at the same time is used to secure the ball of the loss prevention device from falling out, the intermediate sleeve must fit around the tappet insert, which increases the minimum diameter of the drive tappet. As a result, however, the contact point of the tappet insert on the pump piston is then also located relatively high up, so that the pump guide must extend high up as well. Because of the strong driving forces, however, a guide sleeve for the drive tappet that extends far downward is equally necessary, and it therefore has a larger diameter in order to be capable of fitting over the piston guide. The overall result is a relatively large total diameter for the drive tappet.

Another disadvantage of this unit fuel injector is that the pump piston must be pulled out as well in order to remove the loss prevention device.

OBJECT AND SUMMARY OF THE INVENTION

The fuel injection pump, in particular unit fuel injector, according to the invention has an advantage over the prior art that the contact point of the tappet insert on the pump piston can be shifted to very far downward, so that the guide sleeve of the drive tappet can likewise extend very r downward without having to fit around the pump piston guide. As a result, the overall diameter of the drive tappet is reduced, and the clearance for the restoring spring and guide tube is increased. The guidance of the drive tappet is improved as a result; at the same time, the danger of canting because of shear forces is greatly reduced by the low engagement point of the ball tappet bolt on the tappet insert.

Another advantage of this fuel injection pump is that the loss prevention device and securing ball can be removed without having to pull out the pump piston. By releasing a snap ring, the intermediate sleeve is released and can be removed. The securing ball, which is located above the tappet insert, is the removed.

Another advantage of this fuel injection pump is that the pump piston, upon assembly, need not be pulled all the way out of the pump housing. It is sufficient to pull the drive tappet and pump piston upward and out, far enough that the opening provided in the guide sleeve is located outside the guide tube, and that a U-shaped disk holding the pump piston on the tappet insert can be removed through this opening. In the known unit fuel injector referred to above (U.S. Pat. No. 4,452,574), the pump piston need not be removed all the way out of the pump housing, either, but it must be pulled out farther, by the height of the flange disposed at the upper end of the guide sleeve, than in the fuel injection pump according to the invention. Removing the pump piston all the way out makes the assembly more difficult, on the one hand, and on the other might cause damage to the pump piston.

A unit fuel injector is already known (U.S. Pat. No. 2,590,575), in which the pump piston is held on the drive tappet by means of a U-shaped disk. However, this unit fuel injector has neither a loss prevention device nor a ball tappet bolt, so that the problems of space do not arise here to the extent that they do in the fuel injection pump of the generic type. Moreover, in this unit fuel injector, the guide sleeve of the drive tappet does not have a lateral opening for removing the U-shaped disk. Accordingly, here as well, the pump piston must be pulled farther out upon assembly than in the case of the fuel injection pump according to the invention.

In an advantageous feature of the invention, the pump piston is reduced at its end toward the drive tappet. defining a reduced diameter portion The diameter of the collar provided on an end of the reduced diameter portion is equal in size to, or smaller than, the diameter of the non-reduced portion of pump piston. This feature advantageously further reduces the total diameter of the drive tappet, so that the remaining clearance for the restoring spring and guide tube is increased further.

In another advantageous feature of the invention, the tappet insert of the drive tappet is disposed below the intermediate sleeve, and the intermediate sleeve has the same outside diameter as the tappet insert. This makes it possible on the one hand to dispose the engagement point of the ball tappet bolt as low as possible, and on the other hand the total diameter of the drive tappet is reduced by the wall thickness of the intermediate sleeve, since the intermediate sleeve does not fit around the tappet insert. The intermediate sleeve is retained in the guide sleeve by a snap ring and in turn keeps the tappet insert at an intended location in the guide sleeve, because both parts having the same outside diameter abut one another.

In another feature of the invention, an intermediate sleeve is provided on its end toward the tappet insert with an inner collar, which cooperates with a snap ring, as a loss prevention device, that is embedded in a groove of the ball tappet bolt. In a simple manner, this prevents the ball tappet bolt from being able to fall out of the drive tappet when the drive element is removed.

In another advantageous feature of the invention, a lateral opening is machined into the wall of the guide sleeve in the form of a slit transverse to the longitudinal axis of the pump piston; in another advantageous feature, it is embodied as a radial bore. In the case of a drilled lateral opening, another feature of the invention provides that the reduced diameter portion on the pump piston is longer, by at least one-half the diameter of the lateral opening in the guide sleeve, than the sum of the thickness of the U-shaped disk and of the inner collar provided on the guide sleeve. Accordingly, upon assembly, the pump piston can be thrust far enough upward into the guide sleeve that the U-shaped disk under the collar can be fitted around the reduced diameter portion of the pump piston.

In an advantageous development of these characteristics, a shoulder is provided at the transition from a nonreduced to the reduced diameter portion the pump piston; when the U-shaped disk is assembled, a shoulder is supported on the inner collar of the guide sleeve, in order to define the installation position. This makes a particularly simple, fast installation possible, since the installation position of the pump piston for the insertion of the U-shaped disk is defined by pressing the pump piston against the inner collar of the guide sleeve.

In another advantageous feature of the invention, an outer collar provided on the pump piston is radially guided in a recess provided in the face end of the tappet insert oriented toward the pump piston. This feature likewise makes the assembly of the U-shaped disk easier and also serves to provide additional guidance for the pump piston.

In another advantageous feature of the invention, the lower edge of the lateral opening, oriented toward the bearing face of the U-shaped disk, is spaced apart by a small distance *a* from the bearing surface of the U-shaped disk. This small distance has the effect that even in the presence of vibration or similar factors, the U-shaped disk cannot fall out of the lateral opening. If it were not for this distance, one of the two arms of the U-shaped disk could catch in the lateral opening.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
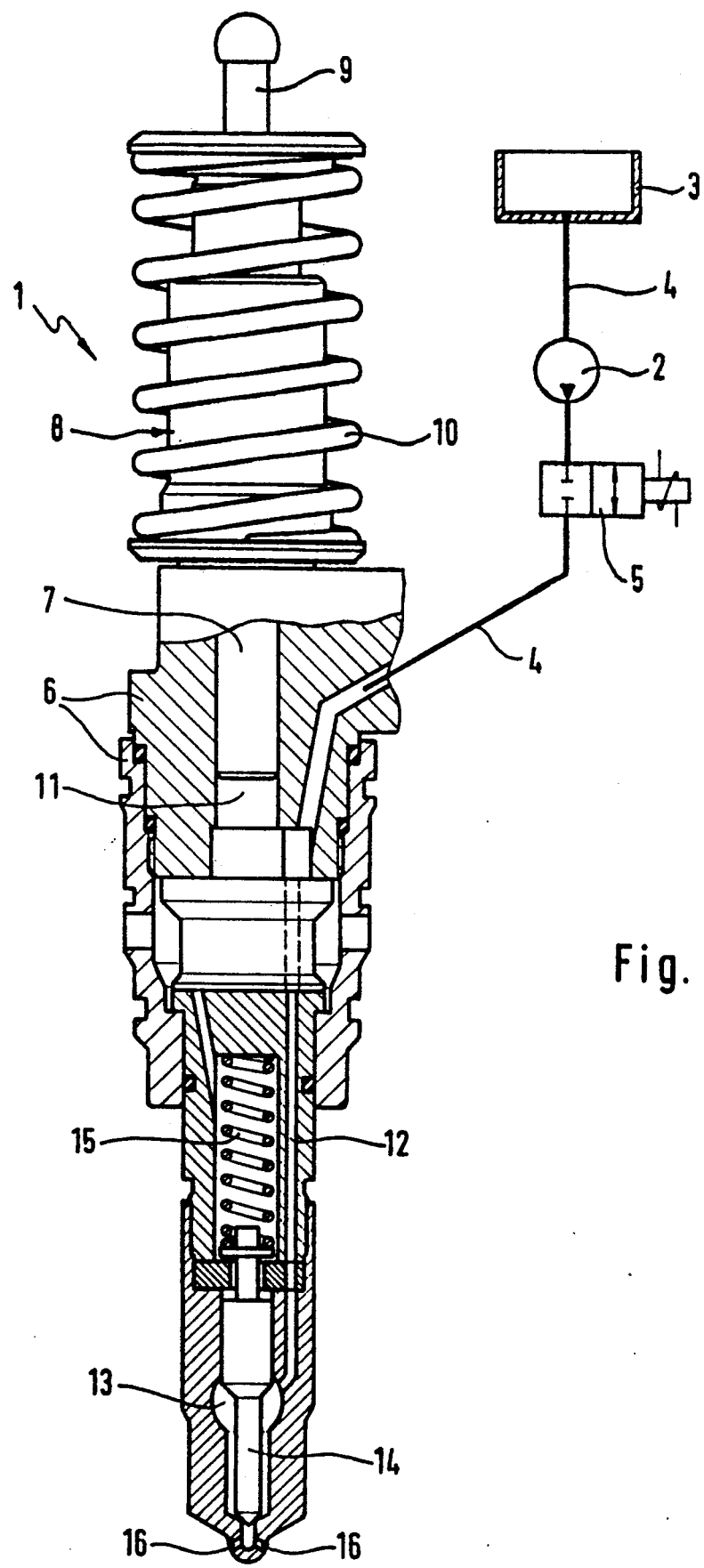
FIG. 1 shows a unit fuel injector in longitudinal section.

In the fuel injection pump shown in the drawing, a unit fuel injector 1 is supplied with fuel via a feed pump 2 from a fuel tank 3; a magnetic valve 5 by which the quantity of the fuel to the unit fuel injector 1 is controlled is disposed in a fuel line 4.

The unit fuel injector 1 has a pump piston 7, guided in a pump housing 6, which is suspended in a drive tappet 8 and is actuated, with the interposition of a tappet bolt 9, by a drive element (not shown) counter to the force of a restoring spring 10. The pump piston 7 and the pump housing 6 define a pump work chamber 11, from which a pressure line 12 leads to a pressure chamber 13, in which a valve needle 14 reciprocates, the valve needle is displaced when there is adequately high injection pressure counter to the force of a closing spring 15 and in so doing uncovers injection ports 16, so that the fuel reaches the engine combustion chamber.

Figure 2:
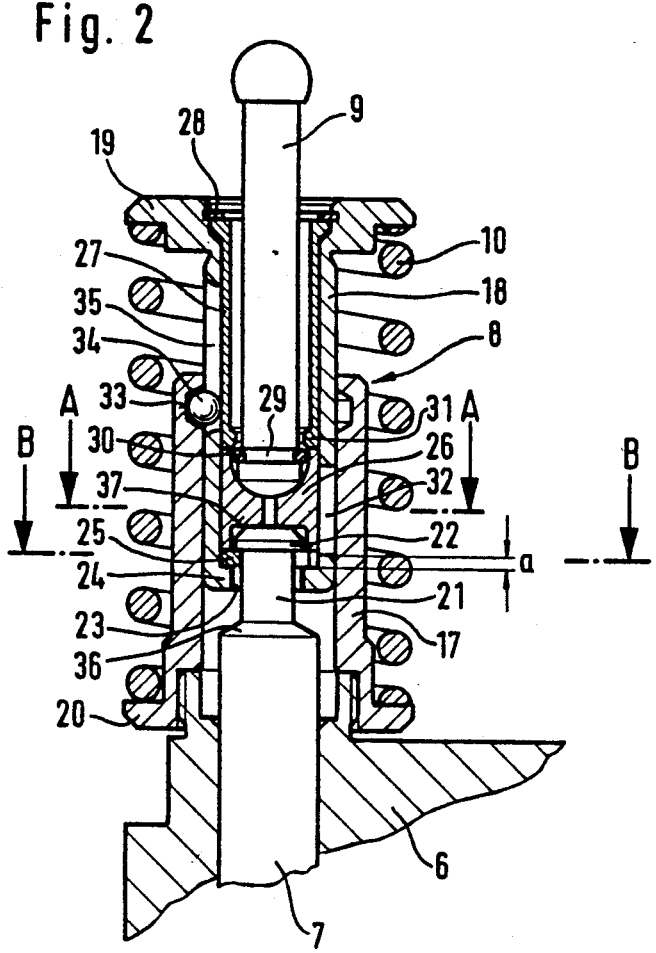
FIG. 2 shows a detail of FIG. 1 on an enlarged scale.

As the detailed view of FIG. 2 shows, a guide tube 17 is disposed on the pump housing 6, concentrically with the pump piston 7: the drive tappet 8 is axially displaceably guided in the pump housing 6 in the longitudinal direction of the pump piston 7. For this purpose, the drive tappet 8 has a guide sleeve 18, the outside diameter of which matches the inside diameter of the guide tube 17. On its end remote from the pump piston 7 and protruding from the guide tube 17, the guide sleeve 18 has a flange 19 that points outward and on which the restoring spring 10 is supported, on its other end, the restoring spring 10 is supported on a second flange 20 pointing outward and disposed on the guide tube 17.

On its end oriented toward the drive tappet 8, the pump piston 7 has a tapered region forming a shoulder 36 which tapers toward a reduced diameter region or portion 21, with a collar 22 pointing outward from an end of the reduced diameter region or portion 21, the diameter of the reduced diameter region 21 is somewhat smaller than the lower opening 23, oriented toward the pump piston 7, of the guide sleeve 18. The width of the opening 23 is defined by an inner collar 24 having a bearing surface 24a (FIGS. 4 and 6) provided on this end of the guide sleeve 18. By means of a U-shaped disk 25, which is disposed around the reduced diameter portion 21 of the pump piston 7 protruding into the guide sleeve 18 and rests on the bearing surface 24a of the inner collar 24 of, the guide sleeve 18, the pump piston 7 is held in contact with a tappet insert 26 provided in the guide sleeve 18; the tappet insert 26 is fixed in turn in the guide sleeve 18 by an intermediate sleeve 27, which is secured against falling out by a snap ring 28 that is supported in the flange 19.

In its face end oriented toward the pump piston 7, the tappet insert 26 is provided with a recess 37, in which the outer collar 22 of the pump piston 7 is radially guided. The tappet insert 26 is engaged from above by the tappet bolt 9 disposed inside the intermediate sleeve 27. On its lower end oriented toward the tappet insert 26, the tappet bolt 9 is equipped with a snap ring 30 placed in a groove 29; the snap ring 30 cooperates with an inner collar 31, provided on the intermediate sleeve 27, to provide a loss prevention device to prevent the tappet bolt 9 from falling out. In the region of the outer collar 22 of the pump piston 7, the guide sleeve 18 is provided with a lateral opening 32, through which the U-shaped disk 25 can be introduced. The lower edge of this opening 32, oriented toward the pump piston 7, preferably is spaced apart by a small distance a from the bearing surface 24a, to prevent the U-shaped disk 25 from falling out.

The unit fuel injector 1 is provided with a loss prevention device for the drive tappet 8 and pump piston 7; a ball 34, placed in a first recess 33 in the guide tube 17, protrudes into a second recess 35 in the guide sleeve 18 and is secured against falling out by the intermediate sleeve 27. The first recess 33 is provided in the form of a radial inner groove in the upper region of the guide tube 17, while the second recess 35 is embodied by a longitudinally extending oblong slot in the outer wall of the guide sleeve 18. The length of the second recess 35 is selected such that during normal operation of the unit fuel injector 1, its lower end does not touch the ball 34 once the pump piston 7 reaches its uppermost position at the end of an intake stroke. As long as the tappet bolt 9 is not loaded by the drive element, the loss prevention device prevents the guide sleeve 18, and with it the pump piston 7, from falling out of the unit fuel injector 1.

Figure 3:
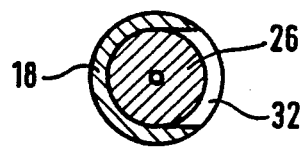
FIG. 3 is a cross section along the line AA in FIG. 2.
Figure 4:
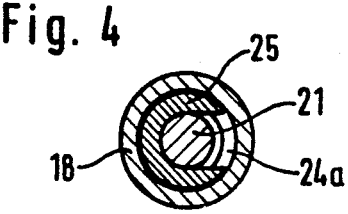
FIG. 4 is a cross section along the line BB in FIG. 2.

The embodiment of the U-shaped disk 25 and of the lateral opening 32 in the guide sleeve 18 can be seen from FIGS. 3 and 4.

Figure 5:
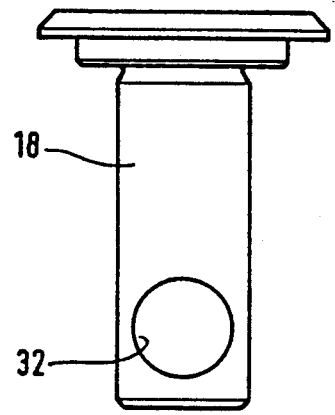
FIG. 5 is a side view of a variant guide sleeve.
Figure 6:
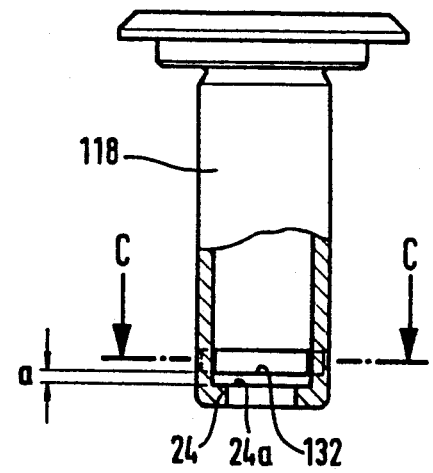
FIG. 6 is a side view, partly in section, of another variant guide sleeve.
Figure 7:
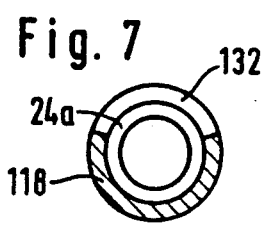
FIG. 7 is a section along the line CC of FIG. 6.

FIGS. 5 and 6 show two different variants of the guide sleeve 18. FIG. 5 shows a guide sleeve 18 having a lateral opening 32 embodied as a radial bore, while the guide sleeve 118 in FIG. 6 is provided with a slit extending transversely to the longitudinal axis of the pump piston 7, as its lateral opening 132. A cross-section through the guide sleeve 118 at the level of the lateral opening 2 is shown in FIG. 7.

For detaching the unit fuel injector 1, the snap ring 28 is removed, the intermediate sleeve 27 that has now been released is pulled out of the guide sleeve 18, and the securing ball 34 is removed. The spring tension of the restoring spring is absorbed in this process with a suitable tool. The guide sleeve 18 is then pulled far enough out of the guide tube 17 that the lateral opening 32 protrudes out of the guide tube 17. Now the U-shaped disk 25 can be removed through the lateral opening 32. The pump piston 7 is now free, and the guide sleeve 18 can be pulled out upward, without having to pull the pump piston 7 any farther out. Finally, the guide tube 17 can be detached from the pump housing 6.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection pump for internal combustion engines, having at least one pump cylinder disposed in a pump housing and one pump piston guided in this pump cylinder; a drive tappet connected to the pump piston and movable counter to the force of a restoring spring in a longitudinal direction of the pump cylinder by means of a drive element with the interposition of a tappet bolt, a guide sleeve encompassing a tappet insert of the drive tappet, a guide tube disposed on the pump housing and surrounded by the restoring spring, in which guide tube the guide sleeve of the drive tappet is guided in a reciprocating direction of the pump piston, a loss prevention device for the drive tappet and pump piston, the loss prevention device includes a ball as its securing element, said ball is axially and radially fixed in a first recess in the guide tube and protrudes into a slitlike second recess in the guide sleeve, this recess extends in the longitudinal direction of the drive tappet, said loss prevention device also has an intermediate sleeve, which covers an inside of the recess provided in the guide sleeve, as a securing means to prevent the ball from falling out of the first recess, said guide sleeve (18), on its end toward the pump piston (7), has an inwardly oriented collar (24) with a bearing surface (24a), on which bearing surface a U-shaped disk (25) rests, and U-shaped disk presses against an outer collar (22) provided on the pump piston (7) on its end oriented toward the drive tappet (8) which protrudes into the guide sleeve (18) and as a result retains the pump piston (7) in contact with the tappet insert (26) of the drive tappet (8), and that a lateral opening (32) through which the U-shaped disk (25) is introduced is provided in the wall of the guide sleeve (18) above the bearing surface (24a) of the U-shaped disk (25).

2. A fuel injection pump as defined by claim 1, in which the pump piston (7) is reduced on its end toward the drive tappet (8) to define a reduced diameter portion, and that a diameter of the outer collar (22) provided on this reduced end is equal in size to a diameter of a non-reduced portion of the pump piston (7).

3. A fuel injection pump as defined by claim 1, in which the tappet insert (26) is disposed below the intermediate sleeve (27), and that the intermediate sleeve (27) has the same outside diameter as the tappet insert (26).

4. A fuel injection pump as defined by claim 2, in which the tappet insert (26) is disposed below the intermediate sleeve (27), and that the intermediate sleeve (27) has the same outside diameter as the tappet insert (26).

5. A fuel injection pump as defined by claim 1, in which said intermediate sleeve (27), on its end toward the tappet insert (26), is provided with an inner collar (31) that cooperates with a snap ring (30) placed in a groove (29) of the tappet bolt (9) to form a loss prevention device for the tappet bolt (9).

6. A fuel injection pump as defined by claim 2, in which said intermediate sleeve (27), on its end toward the tappet insert (26, is provided with an inner collar (31) that cooperates with a snap ring (30) placed in a groove (29) of the tappet bolt (9) to form a loss prevention device for the tappet bolt (9).

7. A fuel injection pump as defined by claim 3, in which said intermediate sleeve (27), on its end toward the tappet insert (26), is provided with an inner collar (31) that cooperates with a snap ring (30) placed in a groove (29) of the tappet bolt (9) to form a loss prevention device for the tappet bolt (9).

8. A fuel injection pump as defined by claim 1, in which the lateral opening (132) is machined into the wall of the guide sleeve (118) in the form of a slit crosswise to the longitudinal axis of the pump piston (7).

9. A fuel injection pump as defined by claim 2, in which the lateral opening (132) is machined into the wall of the guide sleeve (118) in the form of a slit crosswise to the longitudinal axis of the pump piston (7).

10. A fuel injection pump as defined by claim 3, in which the lateral opening (132) is machined into the wall of the guide sleeve (118) in the form of a slit crosswise to the longitudinal axis of the pump piston (7).

11. A fuel injection pump as define by claim 5, in which the lateral opening (132) is machined into the wall of the guide sleeve (118) in the form of a slit crosswise to the longitudinal axis of the pump piston (7).

12. A fuel injection pump as defined by claim 1, in which the lateral opening (32) in the guide sleeve (18) is embodied is a radial bore.

13. A fuel injection pump as defined by claim 2, in which the lateral opening (32) in the guide sleeve (18) is embodied as a radial bore.

14. A fuel injection pump as defined by claim 3, in which the lateral opening (32) in the guide sleeve (18) is embodied as a radial bore.

15. A fuel injection pump as defined by claim 5, in which the lateral opening (32) in the guide sleeve (18) is embodied as a radial bore.

16. A fuel injection pump as defined by claim 13, in which said reduced diameter portion of the pump piston (7) is longer, by at least half the diameter of the drilled lateral opening (32) in the guide sleeve (18), than the sum of the thickness of the U-shaped disk (25) and the thickness of the inner collar (24) provided on the guide sleeve (18).

17. A fuel injection pump as defined by claim 8, in which a shoulder (36) of the pump piston (7) for assembly of the U-shaped disk (25) for defining an installation position is supported on the inner collar (24) of the guide sleeve (18), and said shoulder is provided at the transition from the non-reduced portion to the reduced diameter portion of the pump piston (7).

18. A fuel injection pump as defined by claim 13, in which a shoulder (36) of the pump piston (7) for assembly of the U-shaped disk (25) for defining an installation position is supported on the inner collar (24) of the guide sleeve (18), and said shoulder is provided at the transition from the non-reduced portion to the reduced diameter portion of the pump piston (7).

19. A fuel injection pump as defined by claim 16, in which a shoulder (36) of the piston (7) for assembly of the U-shaped disk (25) for defining an installation position is supported on the inner collar (24) of the guide sleeve (18), and said shoulder is provided at the transition from the non-reduced region to the reduced diameter portion of the pump piston (7).

20. A fuel injection pump as defined by claim 1, in which the outer collar (22) provided on the pump piston (7) is radially guided in a recess (37) provided on the tappet insert (26), in its face end oriented toward the pump piston (7).

21. A fuel injection pump as defined by claim 1, in which an edge toward a bearing face (24a) of the lateral opening (32) is spaced apart by a small distance (a) from the bearing surface (24a) of the U-shaped disk (25).

22. A fuel injection pump as defined by claim 1, in which the pump piston (7) is reduced on its end toward the drive tappet (8) defining a reduced diameter portion (21), and that the diameter of the outer collar (22) provided on this reduced diameter portion is smaller than a diameter of a non-reduced portion of the pump piston (7).

* * * * *